United States Patent
Ashikhmin et al.

(10) Patent No.: US 8,774,146 B2
(45) Date of Patent: Jul. 8, 2014

(54) LARGE-SCALE ANTENNA METHOD AND APPARATUS OF WIRELESS COMMUNICATION WITH SUPPRESSION OF INTERCELL INTERFERENCE

(75) Inventors: Alexei Ashikhmin, Morristown, NJ (US); Thomas L. Marzetta, Summit, NJ (US)

(73) Assignee: Alcatel Lucent, Paris (FR)

( * ) Notice: Subject to any disclaimer, the term of this patent is extended or adjusted under 35 U.S.C. 154(b) by 142 days.

(21) Appl. No.: 13/329,834

(22) Filed: Dec. 19, 2011

(65) Prior Publication Data

US 2013/0156021 A1    Jun. 20, 2013

(51) Int. Cl.
*H04W 92/00* (2009.01)
*H04W 52/24* (2009.01)
*H04L 5/00* (2006.01)
*H04L 27/26* (2006.01)

(52) U.S. Cl.
CPC ............. *H04W 52/243* (2013.01); *H04L 5/005* (2013.01); *H04L 27/2675* (2013.01); *H04W 52/24* (2013.01)
USPC ........... 370/338; 370/343; 370/334; 370/335; 370/479; 455/509; 455/504; 455/524

(58) Field of Classification Search
USPC ......... 370/329, 330, 334, 335, 337, 343, 479; 455/500, 501, 504, 509, 515, 524
See application file for complete search history.

(56) References Cited

U.S. PATENT DOCUMENTS

| | | | |
|---|---|---|---|
| 8,406,766 B2* | 3/2013 | Watanabe et al. ............. | 455/436 |
| 2002/0122461 A1* | 9/2002 | Hervey et al. ................. | 375/132 |
| 2004/0171357 A1* | 9/2004 | Lobinger et al. .............. | 455/101 |
| 2006/0159160 A1* | 7/2006 | Kim et al. ...................... | 375/148 |
| 2006/0176936 A1* | 8/2006 | Wang et al. .................... | 375/146 |
| 2007/0155319 A1* | 7/2007 | Monte et al. .................. | 455/12.1 |
| 2009/0086814 A1* | 4/2009 | Leontaris et al. ........ | 375/240.02 |
| 2009/0252099 A1* | 10/2009 | Black et al. .................... | 370/329 |
| 2010/0039948 A1* | 2/2010 | Agrawal et al. ............... | 370/252 |
| 2010/0067470 A1* | 3/2010 | Damnjanovic et al. ........ | 370/329 |
| 2010/0098042 A1* | 4/2010 | Dent ............................. | 370/342 |
| 2010/0227612 A1* | 9/2010 | Wang et al. .................... | 455/434 |
| 2010/0232488 A1* | 9/2010 | Song et al. .................... | 375/224 |
| 2011/0034179 A1* | 2/2011 | David et al. ................ | 455/456.1 |
| 2011/0058632 A1* | 3/2011 | Siti et al. ....................... | 375/340 |
| 2011/0075617 A1 | 3/2011 | Ashikhmin et al. | |
| 2011/0134812 A1* | 6/2011 | Senarath et al. ............. | 370/280 |
| 2011/0150049 A1* | 6/2011 | Dent ............................. | 375/219 |

(Continued)

OTHER PUBLICATIONS

Thomas Louis Marzetta, et. al., "System and Method of Wireless Communication Using Large-Scale Antenna Networks," U.S. Appl. No. 13/238,329, Sep. 21, 2011, 27 pages.

(Continued)

*Primary Examiner* — Ian N Moore
*Assistant Examiner* — Phong La
(74) *Attorney, Agent, or Firm* — Wolff & Samson, PC (57) ABSTRACT

Methods are provided for mitigating interference due to pilot contamination in a cellular network in which there is reuse of pilot signals. In embodiments, forward-link signals are precoded, using knowledge of slow-fading coefficients, to mitigate the interference. In embodiments, interference in reverse-link signals destined for a given base station is mitigated by linearly combining reverse-link signals destined for the given base station and for other base stations of the network, using knowledge of slow-fading coefficients.

12 Claims, 7 Drawing Sheets

(56) References Cited

U.S. PATENT DOCUMENTS

| | | | |
|---|---|---|---|
| 2011/0249597 A1* | 10/2011 | Papadopoulos | 370/280 |
| 2012/0014476 A1* | 1/2012 | Kuchi et al. | 375/296 |
| 2012/0113953 A1* | 5/2012 | Papadopoulos et al. | 370/330 |
| 2012/0208547 A1* | 8/2012 | Geirhofer et al. | 455/452.2 |
| 2012/0263136 A1* | 10/2012 | Higuchi | 370/329 |
| 2013/0040676 A1* | 2/2013 | Kang et al. | 455/509 |
| 2013/0077469 A1* | 3/2013 | Ma et al. | 370/210 |

OTHER PUBLICATIONS

Thomas Louis Marzetta, et. al., "Mimo System Having a Plurity of Service Antennas for Data Transmission and Reception and Method Thereof," U.S. Appl. No. 13/155,733, Jun. 8, 2011, 40 pages.

Mihailo Stojnic, et. al., "Rate Maximization in Multi-Antenna Broadcast Channels With Linear Preprocessing," IEEE Transactions on Wireless Communications, vol. 5, No. 9, Sep. 2006, pp. 2338-2342.

Thomas L. Marzetta, "Noncooperative Cellular Wireless With Unlimited Numbers of Base Station Antennas," IEEE Transactions on Wireless Communications, vol. 9, No. 11, Nov. 2010, pp. 3590-3600.

Christian B. Peel, et. al., "A Vector-Perturbation Technique for Near-Capacity Multiantenna Multiuser Communication—Part I: Channel Inversion and Regularization," IEEE Transactions on Communications, vol. 53, No. 1, Jan. 2005, pp. 195-202.

Jubin Jose, et. al., "Pilot Contamination and Precoding in Multi-Cell TDD Systems," Draft—IEEE International Symposim on Information Theory (ISIT) [1], Jul. 1, 2010, pp. 1-23.

F. Fernandes, et. al., "Interference Reduction on Cellular Networks with Large Antenna Arrays," unpublished, submitted for review to ICC2012 conference committee on or about Sep. 15, 2011.

Jose, Jubin et al., Pilot Contamination and Precoding in Multi-Cell TDD Systems,IEEE Transactions on Wireless Communications, IEEE Service Center, Piscataway, NJ, USA, vol. 10, No. 8, Aug. 1, 2011, pp. 2640-2651.

Jose, Jubin et al., Pilot Contamination Problem in Multi-Cell TDD Sysstems. International Symposium on Information Theory, ISIT 2009, IEEE, Piscataway, NJ, USA, Jun. 28, 2009, pp. 2184-2188.

Papadopoulos, Haralbos C. et al., Achieving Large Spectral Efficiencies from MU-MIMO with Tens of Antennas: Location-Adaptive TDD MU-MIMO Designs and User Scheduling, 2010 44 Asilomar Conference on Signals, Systems and Computers, Nov. 7-10, 2010, IEEE, Piscataway, NJ, USA, pp. 636-643.

Brunner, Hans H. et al., How Much Training Is Needed for Interference Coordination in Cellular Networks?, 2011 International ITG Workshop on Smart Antennas (WSA), Feb. 24, 2011, IEEE, pp. 1-6.

Ashikhmin, Alexei et al., Pilot Contamination Precoding in Multi-Cell Large Scale Antenna Systems, 2012 IEEE International Symposium on Information Theory Proceedings (ISIT), Jul. 1, 2012, pp. 1137-1141.

Communication Relating to the Results of the Partial International Search, corresponding to PCT Application No. PCT/US2012/061768, filed Oct. 25, 2012, Communication mailed Jan. 7, 2013, pp. 1-3.

Marzetta, Thomas L., "Noncooperative Cellular Wireless with Unlimited Numbers of Base Station Antennas," article, IEEE Transactions on Wireless Communications, vol. 9, No. 11, Nov. 2010, pp. 3590-3600.

PCT International Search Report corresponding to PCT Application No. PCT/US2012/061768 filed Oct. 25, 2012, International Search Report issued Aug. 8, 2013, pp. 1-7.

PCT Written Opinion of the International Searching Authority corresponding to PCT Application No. PCT/US2012/061768 filed Oct. 25, 2012, Written Opinion issued Aug. 8, 2013, pp. 8-15.

* cited by examiner

LARGE-SCALE ANTENNA METHOD AND APPARATUS OF WIRELESS COMMUNICATION WITH SUPPRESSION OF INTERCELL INTERFERENCE

FIELD OF THE INVENTION

The invention relates to methods and systems of wireless communication that use multiple antennas to achieve improved network performance.

ART BACKGROUND

It has long been known that techniques of spatial multiplexing can be used to improve the spectral efficiency of wireless networks. (Spectral efficiency describes the transmitted data rate per unit of frequency, typically in bits per second per Hz.) In typical examples of spatial multiplexing, a multiple array of transmit antennas sends a superposition of messages to a multiple array of receive antennas. The channel state information (CSI), i.e. the channel coefficients between the respective transmit-receive antenna pairs, is assumed known. Provided that there is low correlation among the respective channel coefficients, the CSI can be used by the transmitter, or the receiver, or both, to define a quasi-independent channel for each of the transmitted messages. As a consequence, the individual messages are recoverable at the receiving antenna array.

More recently, experts have proposed extensions of the spatial multiplexing technique, in which a multiplicity of mobile or stationary user terminals (referred to herein as "terminals") are served simultaneously in the same time-frequency slots by an even larger number of base station antennas or the like, which we refer to herein as "service antennas", or simply as "antennas". Particularly when the number of service antennas is much greater than the number of terminals, such networks may be referred to as "Large-Scale Antenna Systems (LSAS)".

Theoretical studies predict that the performance of LSAS networks scales favorably with increasing numbers of service antennas. In particular, there are gains not only in the spectral efficiency, but also in the energy efficiency. (The energy efficiency describes the ratio of total data throughput to total transmitted power, and is measured, e.g., in bits per Joule.)

One such study is T. L. Marzetta, "Noncooperative Cellular Wireless with Unlimited Numbers of Base Station Antennas," *IEEE Trans. on Wireless Communications* 9 (November 2010) 3590-3600, hereinafter referred to as "Marzetta 2010".

In some approaches, the base stations may obtain CSI through a procedure that relies on time-division duplex (TDD) reciprocity. That is, terminals send pilot sequences on the reverse link, from which the base stations can estimate the CSI. The base stations can then use the CSI for beam forming. This approach works well when each terminal can be assigned one of a set of mutually orthogonal pilot sequences.

Generally, it is considered advantageous for the mobiles to synchronously transmit all pilot sequences on a given frequency, and possibly even on all frequencies, making use of the mutual orthogonality of the pilot sequences.

The number of available orthogonal pilot sequences, however, is relatively small, and can be no more than the ratio of the coherence time to the delay spread. Terminals within a single cell can use orthogonal pilot sequences, but terminals from the neighboring cells will typically be required to reuse at least some of the same pilot sequences. This reuse of pilot sequences in different cells creates the problem of pilot contamination. The pilot contamination causes a base station to beam-form its message-bearing signals not only to the terminals located in the same cell, but also to terminals located in the neighboring cells. This is so-called directed interference. The directed interference does not vanish as the number of base station antennas is growing. In fact, the directed intercell interference—along with the desired signals—grows in proportion to the number of base station antennas.

As shown in Marzetta 2010, for example, as the number of base station antennas grows in an LSAS network, intercell interference arising from pilot contamination will eventually emerge as the dominant source of interference.

What has been lacking, until now, is an approach that can suppress this intercell interference and thus achieve even greater SINRs.

SUMMARY OF THE INVENTION

We have found such an approach.

Our new approach relies on a factoring of the fading coefficients (also referred to here as "channel" or "propagation" coefficients) into two components: a fast fading coefficient and a slow fading coefficient (which is also often referred to as a "shadow fading" coefficient).

In implementations of our new approach, the beam-forming which each base station performs based on its knowledge of the fast-fading channel to its own terminals is preceded by Pilot Contamination Precoding (PCP). The PCP is performed jointly by the base stations, utilizing only the slow-fading components of the channel coefficients. According to this approach, the data destined for all terminals are made available to all base stations, and the slow-fading coefficients between each base station array and each terminal are made available to all base stations. The fading behavior responsible for the slow-fading coefficients changes very slowly compared with fast fading. It is independent of frequency, and the slow-fading coefficients are substantially equal for all of the antennas comprising a particular base station array. As a consequence, it is feasible to obtain and to periodically update accurate estimates of the slow-fading coefficients.

The PCP anticipates that in the limit of a large number of antennas, the known precoding technique for beam forming will create composite signals at each terminal. Each such composite signal is a linear combination of the desired message-bearing symbol together with message-bearing symbols that belong to terminals, in other cells, that share the same pilot sequence. The combining coefficients are associated only with slow-fading. The PCP, jointly over the multiplicity of cells, implements a matrix inversion or other operation to at least partially cancel the cell-to-cell combining of corresponding symbols across cells that would otherwise occur. We believe that as the number of base station antennas grows very large, this approach can achieve very high SINR values.

Similar principles are applicable and advantageous when applied to the reverse data link.

Accordingly, in an embodiment, a base station obtains a message destined for each of one or more same-cell terminals, a same-cell terminal being a terminal served by the base station; and the base station further obtains a message destined for each of one or more other-cell terminals belonging to each of two or more terminal groups, an other-cell terminal being a terminal served by another base station. In this regard, a "terminal group" is a reuse group for pilot signals transmitted by terminals. The base station linearly combines the messages destined for the same-cell and other-cell terminals of each terminal group, thereby to form a pilot contamination precoded message for each terminal group. The base station then transmits the pilot contamination precoded messages synchronously with the other base stations.

It should be understood in this regard that a "message" is the whole or any portion of a body of data to be transmitted. A message may be encoded in the form of one or more symbols, each symbol having an information content of one or more binary bits.

In another embodiment, the base station receives a respective reverse-link signal from each of two or more terminal groups, wherein each said signal is a combination of reverse-link signals synchronously transmitted by a plurality of same-cell and other-cell terminals in the same terminal group. The base station obtains from each of one or more other base stations a further reverse-link signal received by the other base station from each of the terminal groups. The base station linearly combines selected received signals and obtained signals, thereby to recover reverse-link messages transmitted by same-cell terminals in each of two or more terminal groups.

In other embodiments, one or more of the steps described above are performed at nodes of the network that are distinct from the base stations, or are divided among several base stations.

In another embodiment, base station apparatus comprises a module adapted for obtaining messages destined for a plurality of same-cell terminals and for a plurality of other-cell terminals. The apparatus further comprises a module adapted to form a plurality of pilot contamination precoded messages from said messages, wherein each said precoded message pertains to a respective terminal group, and each pilot contamination precoded message is a linear combination of the messages destined for the same-cell and other-cell terminals of a respective terminal group. The apparatus further comprises a module adapted for transmitting the pilot contamination precoded messages synchronously with the other base stations.

It should be understood in this regard that a "module" may be a specialized circuit or combination of circuits, or it may be a set of instructions recorded in a machine-readable memory, together with general-purpose or special-purpose circuitry capable of carrying out the recorded instructions.

In another embodiment, base station apparatus comprises a module adapted for receiving a respective reverse-link signal from each of a plurality of terminal groups, wherein each said signal is a combination of reverse-link signals synchronously transmitted by a plurality of same-cell and other-cell terminals in the same terminal group. The apparatus further comprises a module adapted for obtaining from each of a plurality of other base stations a further reverse-link signal received by the other base station from each of the terminal groups. The apparatus further comprises a module adapted for linearly combining selected received signals and obtained signals, thereby to recover reverse-link messages.

In another embodiment, a base station comprises a module adapted to precode forward-link signals to mitigate inter-cell interference due to pilot contamination arising from reuse of pilot signals. In further embodiments, the base station further comprises a module adapted to linearly combine signals received on the reverse link by said base station with signals received on the reverse link by other base stations of said cellular network, thereby to mitigate interference in said reverse-link signals due to said pilot contamination.

DETAILED DESCRIPTION

A message-carrying signal transmitted from a base station antenna array during one channel use interval is referred to here as a "symbol". A symbol is distributed in space and frequency, because each base station has multiple antennas for transmission, and because each symbol will typically be distributed over multiple OFDM subcarriers or "tones".

The term "antenna" refers to a base station antenna associated with a cell. Each cell has at most M antennas. The term "terminal" refers to a mobile user terminal.

The total number of cells is L. Each cell contains at most K terminals. The total number of pilot signals is K. The pilot signals are numbered 1, ..., K. The pilot signals are assumed to be allocated to terminals such that in each cell, the k-th terminal is allocated pilot signal k.

Antenna mj is the m-th antenna of cell j. Terminal kl is the k-th terminal of cell l.

For tone n, the channel coefficient between antenna mj and terminal kl is $g_{nmjkl}$. Hereinafter, the tone index n will be suppressed from our notation. An M×K channel matrix $G_{jl}$ is defined between the base station of cell j and the terminals of cell l by:

$$[G_{jl}]_{m_1 k_1} = g_{nmjkl}; m = m_1, k = k_1. \tag{1}$$

The channel coefficient g may be factored into a fast fading factor h and a slow fading factor $\beta^{1/2}$:

$$g_{nmjkl} = h_{nmjkl} \cdot \beta_{jkl}^{1/2}. \tag{2}$$

The h coefficients, which represent fast fading, can change with as little as ¼ wavelength of motion. On the other hand, the fading behavior represented by the $\beta$ coefficients, is slowly varying. Although the $\beta$ coefficients (i.e., the slow-fading coefficients) are often referred to as "shadow" fading coefficients, this fading is typically a combination of geometric attenuation and shadow fading. Typically, it is constant over frequency and slowly varying over space and time. By contrast, fast fading typically changes rapidly over space and time. In frequency, fast fading varies over frequency intervals that are the reciprocal of the channel delay spread. Without loss of generality in our mathematical analysis below, we can make the convenient assumption that the h coefficients have unit variance. (We have the freedom to do so because the multiplicative decomposition of g is non-unique).

It will be seen that the slow-fading coefficient in Equation (2) has been indexed for the base station of cell j and the k-th terminal of cell l. It has not been indexed for an individual antenna of the base station of cell j because these coefficients are assumed quasi-independent of spatial location, at least on the spatial scale of an antenna array. One generalizing approach, useful when antenna arrays are so large that this assumption may fail, will be discussed below.

Figure 1:
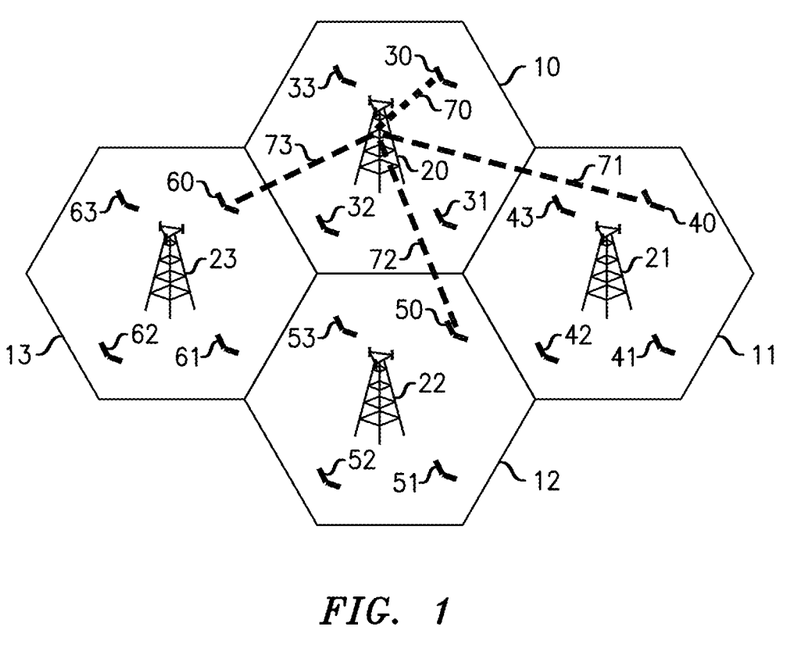
FIG. 1 is a schematic drawing of a portion of an LSAS network, illustrating intercell interference due to pilot contamination.

FIG. 1 shows a portion of a cellular network, including cells 10-13, having respective base stations 20-23. A plurality of mobile terminals is shown in each cell, respectively labeled 30-33, 40-43, 50-53, and 60-63. To simplify the drawing, each of the base stations is treated as having only a single antenna.

In forward-link transmission, base station 20, for example, transmits a message to terminals 30 on path 70. If terminals 40, 50, and 60 have been assigned the same pilot signal as terminal 30, pilot contamination may cause the transmitted message to interfere on paths 71, 72, and 73 to terminals 40, 50, and 60, respectively.

Conversely, in reverse-link transmission, terminal 30 transmits a message to base station 20 on path 70. (For purposes of this illustration, we are treating paths 70-73 as bidirectional.) Pilot contamination may cause the reverse-link messages on paths 71-73 to interfere, at base station 20, with the reverse-link message transmitted from terminal 30 on path 70.

Figure 2:
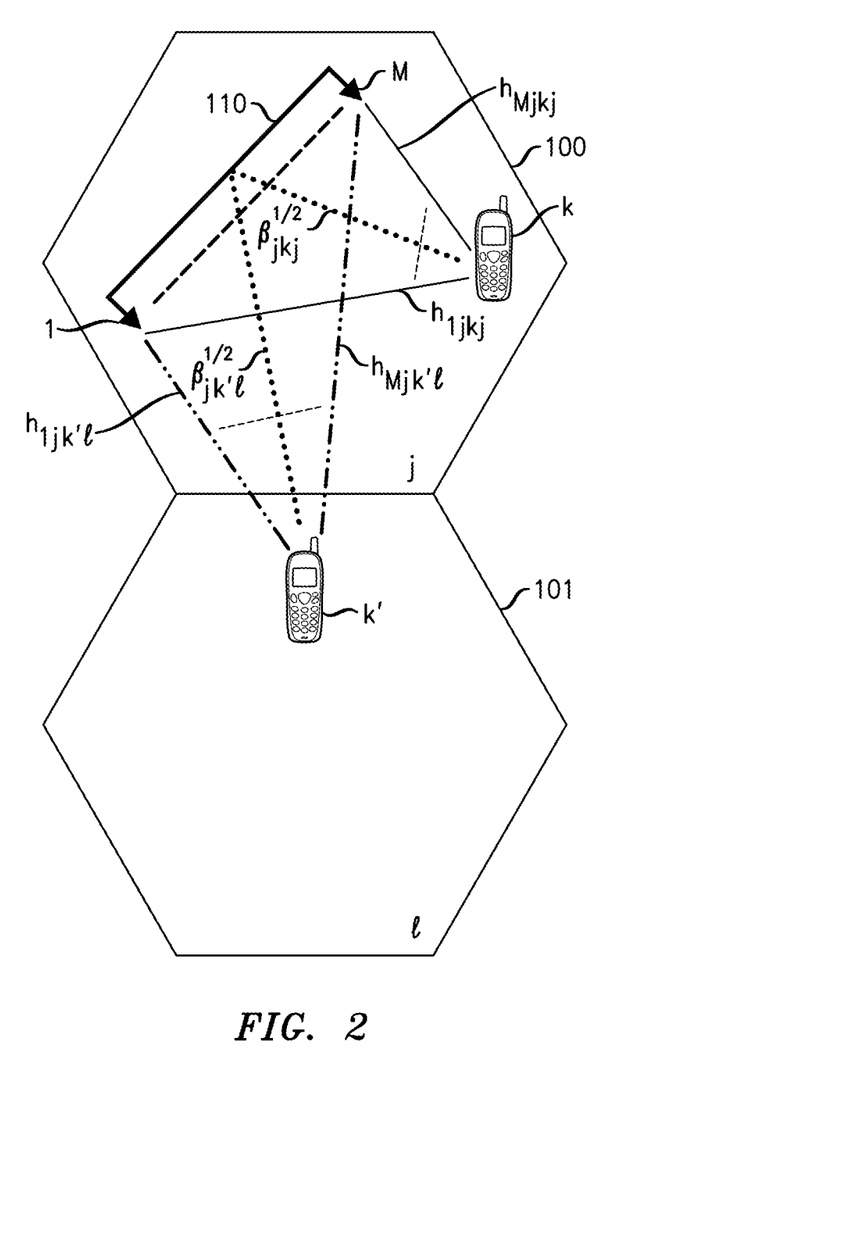
FIG. 2 is a schematic drawing of a portion of an LSAS network, illustrating a distinction between fast-fading coefficients and slow-fading coefficients.

FIG. 2 shows a portion of a cellular network, including cells 100 and 101. To illustrate what is meant by fast-fading and slow-fading coefficients, we have included, in the figure, base station antenna array 110 of cell 100, mobile terminal k of cell 100, and mobile terminal k' of cell 101. To simplify the figure, all other features of the cells have been omitted. As indicated in the figure, cell 100 is cell j for purposes of this illustration, and cell 101 is cell l. Antenna array 110 includes M antennas, of which antenna 1 and antenna M have been explicitly shown. Although antenna array 110 has been drawn, for convenience, as a linear array, it should be noted that there is no requirement for the geographical distribution of antennas to take a linear shape, or any other particular shape. Likewise, the scale of the linear antenna array has been drawn, solely for convenience, as comparable to the size of the cell. There is no limitation on the geographical scale of the antenna array, except that it will generally be advantageous to space the antennas apart by at least one-half wavelength to minimize the electromagnetic coupling between antennas.

Turning to the figure, it will be seen that propagation paths from antenna 1 to terminal k, antenna 1 to terminal k', antenna M to terminal k, and antenna M to terminal k' have been respectively labeled with the fast-fading coefficients $k_{ljkj}$, $k_{ljkl}$, $h_{Mjkj}$, and $h_{Mjk'l}$. Two slow-fading coefficients have also been indicated in the figure. They are $\beta_{jkj}^{1/2}$ from antenna array 110 to terminal k of cell j, and $\beta_{jk'l}^{1/2}$ from antenna array 110 to terminal k' of cell l. Other fast-fading coefficients from intermediate antennas of array 110 to the respective terminals are indicated only by broken lines in the figure.

We assume in the following discussion that OFDM signal modulation is used for both forward link and reverse link signals. It should be understood, however, that the invention is not limited to OFDM, but may be implemented using other modulation techniques such as time-reversal modulation or CDMA modulation.

The number M of antennas per base station may take any value within a wide range. However, fewer than 20 antennas will probably be insufficient to realize the benefits of signal averaging than will be described below. On the other hand, more than 1000 antennas, although advantageous for optimizing performance, will probably be impractical due to limitations of space and cost.

Before describing our new approach, we will briefly describe the approach for forward-link transmission that is described in Marzetta 2010. As explained there, for forward-link transmissions, each cell transmits an M×1 vector, obtained by applying an M×K precoding matrix to a K×1 vector whose entries are the symbols destined for respective terminals served by that cell. The precoding matrix is the conjugate of the estimated channel matrix within a given cell between the base station antennas and the terminals served by that cell. Thus, the j-th base station transmits $\hat{G}^*_{jj}\bar{a}(j)$, where the first term is the precoding matrix and the second term is the K×1 vector of symbols to be transmitted. The precoding matrix is the M×K matrix given by:

$$[\hat{G}^*_{jj}]_{m_1 k_1} = \hat{g}_{nmjkl}; m=m_1, k=k_1, l=j, \qquad (3)$$

where for each (n, m, j, k, l), each entry $\hat{g}^*_{nmjkl}$ is the complex conjugate of an estimate of the $g_{nmjkl}$ given above.

The vector $\bar{a}(j)$ is given by $$\bar{a}(j) = \begin{pmatrix} a_{1j} \\ a_{2j} \\ \vdots \\ a_{Kj} \end{pmatrix}, \qquad (4)$$

in which entry $a_{kj}$ is the symbol from the j-th base station that is destined for the k-th terminal within cell j.

The process of estimating the channel matrix is contaminated by pilots from other cells. That is, each measurement of a channel coefficient between a given antenna and a terminal k contains additive contributions due to the channel coefficients between the given antenna and the k-th terminals of other cells. As a consequence, the entries in the matrix estimate $\hat{G}^*_{jj}$ contain pilot contamination.

All of the base stations transmit synchronously. Thus, each terminal receives a sum of the synchronous transmissions from all of the base stations, including the combined effects of the precoding matrix and the physical propagation channel.

That is, if we let $\bar{x}_l$ be the K×1 vector of signals received by the K terminals of cell l, each of those signals being summed over all L base stations, we have $$\bar{x}_l = \sqrt{\rho_f} \sum_{j=1}^{L} G_{jl}^T \left[ \sqrt{\rho_p} \sum_{l'=1}^{L} G_{jl'} + V_j \right]^* \bar{a}_j + \bar{w}_l. \qquad (5)$$

In the preceding expression, $\bar{w}_l$ is a vector of uncorrelated noise, $\rho_f$ is a measure of the forward signal-to-noise ratio (SNR), the superscript "T" denotes matrix transposition without conjugation, $V_j$ is an M×K matrix of receiver noise whose components are assumed to be randomly distributed with zero mean, mutually uncorrelated, and uncorrelated with the propagation matrices, and $\rho_p$ is a measure of pilot signal SNR.

We assume that the channel vectors of k-th users (that is, the k-th columns of the matrices $G_{jl}$) are quasi-orthogonal. In other words, we assume that if w and y are the k-th columns of different matrices $G_{jl}$, then $$\left(\frac{1}{M}\right)|w^\dagger y|^2 \approx 0.$$

We believe that such an assumption will generally be justified from the following considerations:

Under the assumption of independent Rayleigh fading, quasi-orthogonality follows by necessity. Even under line-of-sight propagation conditions, however, when independent Rayleigh fading cannot be assumed, the channel vectors can still be assumed to be quasi-orthogonal. That is, if the terminals are randomly located, then all that is required for asymptotic orthogonality is that for sufficiently large values of M, the typical angular spacing between any two terminals should exceed the angular Rayleigh resolution limit of the array of base station antennas. (As expressed in radians, the angular Rayleigh resolution limit is the wavelength divided by the linear extent of the array).

Those skilled in the art will understand that the assumption of asymptotic orthogonality might not hold if the base station antennas and terminals are in a tunnel or other such region that behaves as a wave guide having a finite number of normal modes, or if there is a so-called keyhole phenomenon, in which all radiation must pass through a small bundle of scatterers.

Under the assumption of asymptotic orthogonality, the preceding expression for $\bar{x}_l$ reduces, for large M, to a simpler expression because in the limit of large M, all interference vanishes except for residual interference due to intercell coupling via the slow fading coefficients. This coupling causes the k-th terminal in each cell to suffer interference only from symbols destined for the k-th terminals of other cells.

As a consequence, the k-th terminal in the l-th cell receives the signal $\bar{x}_{kl}$, in which $$\frac{1}{M\sqrt{\rho_p\rho_f}}\bar{x}_{kl}$$

is given by $$\sum_{j=1}^{L}\beta_{jkl}a_{kj} = (\beta_{1kl}, \beta_{2kl}, \ldots, \beta_{Lkl}) \cdot \begin{pmatrix} a_{k1} \\ a_{k2} \\ \vdots \\ a_{kL} \end{pmatrix}, \quad (6)$$

where $a_{kl}$ is the symbol destined for the k-th terminal of cell 1, $a_{k2}$ is the symbol destined for the k-th terminal of cell 2, etc.

We now define a matrix S of message-bearing symbols by $[S]_{kj}=a_{kj}$, where as above $a_{kj}$ is the symbol from the j-th base station that is destined for the k-th terminal within cell j. Writing the matrix out explicitly, we have $$S = \begin{bmatrix} a_{11} & a_{12} & \ldots & a_{1j} & \ldots & a_{1L} \\ a_{21} & a_{22} & \ldots & a_{2j} & \ldots & a_{2L} \\ \vdots & \vdots & \ldots & \vdots & \ldots & \vdots \\ a_{k1} & a_{k2} & \ldots & a_{kj} & \ldots & a_{kL} \\ \vdots & \vdots & \ldots & \vdots & \ldots & \vdots \\ a_{K1} & a_{K2} & \ldots & a_{Kj} & \ldots & a_{KL} \end{bmatrix}. \quad (7)$$

It will now be seen that the second multiplicative term on the right-hand side of the above expression for $$\frac{1}{M\sqrt{\rho_p\rho_f}}\bar{x}_{kl}$$

is the k-th column of the matrix $S^T$, where the superscript "T" denotes matrix transposition without conjugation.

More generally, the respective signals received by the k-th terminals in all cells are expressed (neglecting, to simplify the expressions, the factor $M\sqrt{\rho_p\rho_f}$) in an L×1 vector given by the product:

$$B(k) \cdot \begin{pmatrix} a_{k1} \\ a_{k2} \\ \vdots \\ a_{kL} \end{pmatrix}, \quad (8)$$

where $$B(k) = \begin{pmatrix} \beta_{1k1} & \beta_{2k1} & \ldots & \beta_{Lk1} \\ \beta_{1k2} & \beta_{2k2} & \ldots & \beta_{Lk2} \\ \vdots & \vdots & \vdots & \vdots \\ \beta_{1kL} & \beta_{2kL} & \ldots & \beta_{LkL} \end{pmatrix}.$$

Accordingly, it will be seen that the above expression for $$\frac{1}{M\sqrt{\rho_p\rho_f}}\bar{x}_{kl}$$

is the scalar product of the l-th row of B(k) times the k-th column of $S^T$.

Now define a pilot contamination precoding matrix $A(k)=f[B(k)]$, where $f[\bullet]$ denotes matrix inversion or another function for obtaining a precoding matrix that minimizes interference and maximizes the power of useful signals. One alternative to matrix inversion, known to those skilled in the art, is the nonlinear precoding technique often referred to as dirty paper precoding.

Various other alternatives to matrix inversion are known. For example, a technique for obtaining a precoding matrix to be used in beamforming is described in C. B. Peel et al., "A vector-perturbation technique for near-capacity multiantenna multiuser communication-part I: Channel inversion and regularization," *IEEE Transactions on Communications* 53 (January 2005) 195-202. Another such technique is described in H. Vikalo et al., "Rate maximization in multi-antenna broadcast channels with linear preprocessing," *IEEE Transactions on Wireless Communications* 5 (September 2006) 2338-2342.

Let the entries in A(k) be designated by:

$$A(k) = \begin{pmatrix} {}^kA_{11} & {}^kA_{12} & \ldots & {}^kA_{1L} \\ {}^kA_{21} & {}^kA_{22} & \ldots & {}^kA_{2L} \\ \vdots & \vdots & \vdots & \vdots \\ {}^kA_{L1} & {}^kA_{L2} & \ldots & {}^kA_{LL} \end{pmatrix} = \begin{pmatrix} {}^k\underline{A}_1 \\ {}^k\underline{A}_2 \\ \vdots \\ {}^k\underline{A}_L \end{pmatrix} \quad (9)$$

We will now introduce our new approach, which deviates from the procedure described in Marzetta (2010):

Forward Link

Previously, we stated that the j-th base station transmits $\hat{G}^*_{jj}\bar{a}(j)$, where the first term is the precoding matrix and the second term is the vector of symbols to be transmitted, i.e., $$\overline{a}(j) = \begin{pmatrix} a_{1j} \\ a_{2j} \\ \vdots \\ a_{Kj} \end{pmatrix}.$$

Now define $$s(k) = \begin{pmatrix} a_{k1} \\ a_{k2} \\ \vdots \\ a_{kL} \end{pmatrix},$$

where entry $a_{kj}$ is defined as above, and $s(k)$ is the k-th column of $S^T$.

Under our new procedure, by contrast, the j-th base station transmits $\hat{G}^*_{jj}\overline{c}(j)$, where $$\overline{c}(j) = \begin{pmatrix} c_1(j) \\ c_2(j) \\ \vdots \\ c_K(j) \end{pmatrix}, \quad (10)$$

and entry $c_k(j)$ is defined by $$c_k(j) = {}^k\underline{A}_j \cdot s(k). \quad (11)$$

Stated differently, $$\overline{c}(j) = \text{diag}\left[\begin{pmatrix} {}^1\underline{A}_j \\ {}^2\underline{A}_j \\ \vdots \\ {}^K\underline{A}_j \end{pmatrix} S^T\right], \quad (12)$$

where as will be understood from the preceding discussion, ${}^k\underline{A}_j$ is the j-th row of the matrix A(k), and for any square matrix M, diag(M) is the vector whose entries are the diagonal entries of the matrix M.

For complete cancellation of interference due to pilot contamination on the forward link, it is desirable to make the transmit power of the j-th base station proportional to the squared norm of the vector $\hat{G}^*_{jj}\overline{c}(j)$. In other words the transmit power of the j-th base station will be $P_j = \rho_f \|\hat{G}^*_{jj}\overline{c}(j)\|^2$, where $\rho_f$ is a scaling factor that is uniform for all base stations. Other factors may dictate that the transmit power of a given base station must deviate from $P_j$, but even under such nonideal circumstances, we believe it will be rare for such deviations to be substantial. In the event that there are substantial deviations, they should be expected to result in inter-cell interference.

Figure 3:
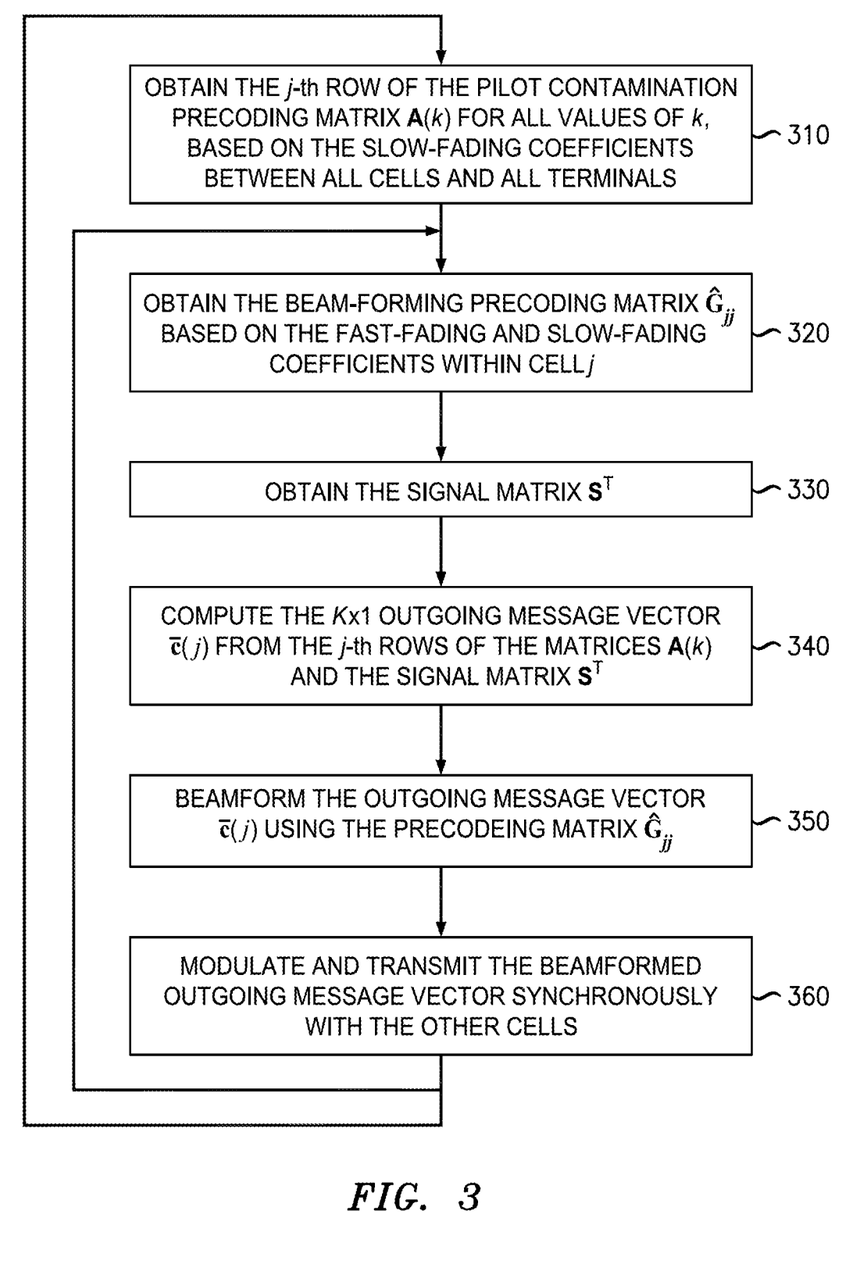
FIG. 3 is a flowchart illustrating the processing of forward-link signals by a base station, according to an embodiment of the invention.

The preceding discussion is summarized in FIG. 3, to which we now turn. The figure illustrates one possible procedure for processing the forward-link signals, which is meant to be exemplary and not limiting. Each base station in the network carries out the procedure illustrated in the figure. The figure is directed to the steps of the procedure as performed by one representative base station, namely base station j:

At 310, base station j obtains the j-th row of the pilot contamination precoding matrix A(k), for all values of k. We now introduce the concept of a terminal group, which consists of all terminals having the same index k. Thus, there are K terminal groups, and each terminal group consists of (at most) one terminal from each cell of the network. Accordingly, we will refer to the index k as the terminal group index.

At 320, base station j obtains the beamforming precoding matrix $\hat{G}^*_{jj}$. At 330, base station j obtains the signal matrix $S^T$.

Methods for distributing the pilot contamination and beamforming precoding matrices and the outgoing signal matrix to the base stations will be described below. As shown in the figure, the matrix A(k) may be updated on a different cycle from the cycle for updating $\hat{G}^*_{jj}$ and $S^T$. That is because A(k) is based on the slow-fading coefficients, which we assume can be treated as static over at least several symbol intervals, and possibly over durations of ten symbol intervals or even more.

At 340, base station j computes its own outgoing message vector $\overline{c}(j)$ from the j-th rows of the K pilot contamination precoding matrices A(k), and from the signal matrix $S^T$. It should be noted that the message vector $\overline{c}(j)$ has K entries, and that each of those entries is a linear combination of message-bearing symbols destined for the respective terminals belonging to one of the K terminal groups.

At 350, base station j beamforms the outgoing message vector (j) using the beamforming precoding matrix $\hat{G}^*_{jj}$. At 360, base station j modulates and transmits the beamformed outgoing message vector synchronously with all of the other L-1 base stations of the network.

The slow fading coefficients $\beta_{jkl}$ can be estimated without great difficulty, because generally, they may be assumed constant over the M base station antennas, over frequency, and over at least several timeslots. Here, we provide one exemplary procedure for estimating the slow-fading coefficient between each terminal in every cell and every base station antenna array:

One or more OFDM symbols are dedicated for slow-fading coefficient estimation. Typically, about 1400 distinct tones will be available per OFDM symbol. (This estimate assumes a 20-MHz bandwidth and a symbol duration of ⅔×100 microseconds.) Each terminal is assigned a different one of the available tones. A global enumeration is imposed on all of the terminals, across all cells, so that each terminal has a unique sequential number q. Now for all q, the q-th terminal sends a pilot signal in the q-th tone.

Suppressing for now the cell index j and the terminal index k, and assuming that the pilot sequence has unit power, we can state that a base station receives at the m-th antenna, on the q-th tone, the signal $x_m(q) = g_m(q) = \sqrt{\beta}h_m(q)$, where $g_m(q)$ is the channel coefficient on tone q between the m-th base station antenna and the q-th terminal. As explained above, $g_m(q)$ may be factored into a fast-fading coefficient $h_m(q)$ and a slow-fading coefficient $\sqrt{\beta}$ that that is approximately independent of q and m. As noted above, we can assume without loss of generality that h, is randomly distributed with unit variance. Hence, we can estimate $\beta$ as $$\beta \cong \frac{|x_1|^2 + |x_2|^2 + \ldots + |x_M|^2}{M}.$$

Typically, the terminals will transmit their pilot signals synchronously. To improve the estimates, multiple tones may be assigned to each terminal and averaging may be performed over the tones. Likewise, averaging may be performed over multiple OFDM symbols.

If the terminals use a multiplicity of n OFDM symbols to transmit their pilots, then the same tone can be shared among n terminals, provided the n terminals are transmitting mutually orthogonal sequences of n symbols in a given tone. In such a case, the total number of terminals that can be served (for the purpose of β coefficient estimation) is the product of number of available tones times pilot length, i.e. 1400n in the above example.

Mobile terminals that are sufficiently distant from each other that their mutual interference is negligible can reuse the same tone and the same pilot sequence.

If cell j has a very large antenna array, the assumption of spatial quasi-independence may fail. In such a case, it will be advantageous to partition the array of, e.g., M antennas into two or more sub-arrays of respectively $M_1$ antennas, $M_2$ antennas, etc., over each of which the assumption is valid. Then, each slow-fading coefficient is advantageously estimated as a weighted average $\beta_{jkl}^{ave}$, given by $$\beta_{jkl}^{ave} = \frac{1}{M}\sum_{w=1}^{W} M_w \beta_{jkl}^w, \text{ where } \sum_{w=1}^{W} M_w = M,$$

and $\beta_{jkl}^w$ is the slow-fading coefficient as estimated for the w-th sub-array.

Typically, it will also be desirable to obtain an estimate of the background noise variance. This may be used for estimating the signal-to-noise ratio, which may be used in turn for determining appropriate data transmission rates, optimizing power allocations, and the like. The background noise variance can be estimated, for example, during an OFDM symbol interval in which all the terminals are silent.

Figure 4:
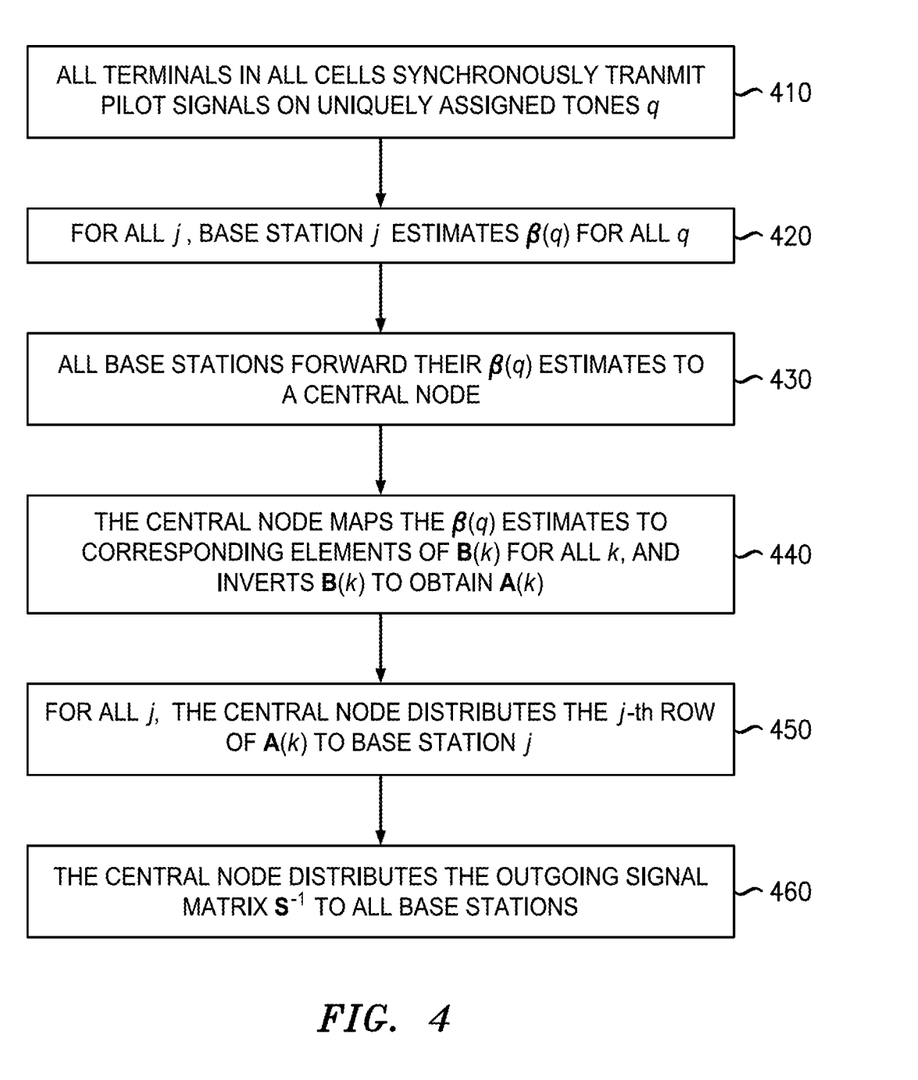
FIG. 4 is a flowchart illustrating one exemplary method for acquiring slow-fading coefficients for use in implementations of the invention.

The preceding discussion is summarized in FIG. 4, which illustrates one possible procedure for estimating the slow-fading coefficients and for obtaining the columns of the matrices A(k). The illustrated procedure is provided as an example only, and is not meant to be limiting.

Turning now to FIG. 4, it will be seen that at 410, all terminals in all cells synchronously transmit their pilot signals on their respective, uniquely assigned tones q. At 420, each of the base stations estimates the slow-fading coefficients between itself and each of the (at most) KL terminals. At 430, all of the base stations forward their estimates β(q) to a central node of the network.

In an LTE network, for example, one base station, i.e., one eNode-B, may be selected to serve as the central node. Other possibilities will be discussed below.

At 440 a server at the central node maps the channel estimates β(q) to the corresponding elements of the slow-fading matrix B(k) for each terminal group k. For each terminal group, the server inverts B(k) to obtain the corresponding pilot contamination precoding matrix A(k).

At 450, the server distributes a respective row of A(k) to each of the base stations j, j=1, . . . , L. That is, base station j receives the j-th row of each of the K pilot contamination precoding matrices.

At 460, the server distributes the same outgoing signal matrix $S^T$ to each of the base stations.

As noted above, one base station may serve as the central node. More specifically, one eNode-B may serve as the central node in a network in which all of the base stations are eNode-Bs in mutual communication over X2 interfaces.

In another example, the network includes 3GPP base stations of various kinds, which may include, e.g., any combination of LTE, WCDMA, and UMTS base stations. Each such base station has an interface to a Serving Gateway (SGW), through which it communicates with other 3GPP base stations of various kinds. In such a network, the central node functionality may advantageously reside at the SGW, which lies within the core network.

In another example, the network includes both 3GPP base stations and base stations belonging to non-3GPP technologies such as CDMA or DO. There, the central node functionality advantageously resides at the PDN Gateway (PGW), which also lies within the core network.

Figure 5:
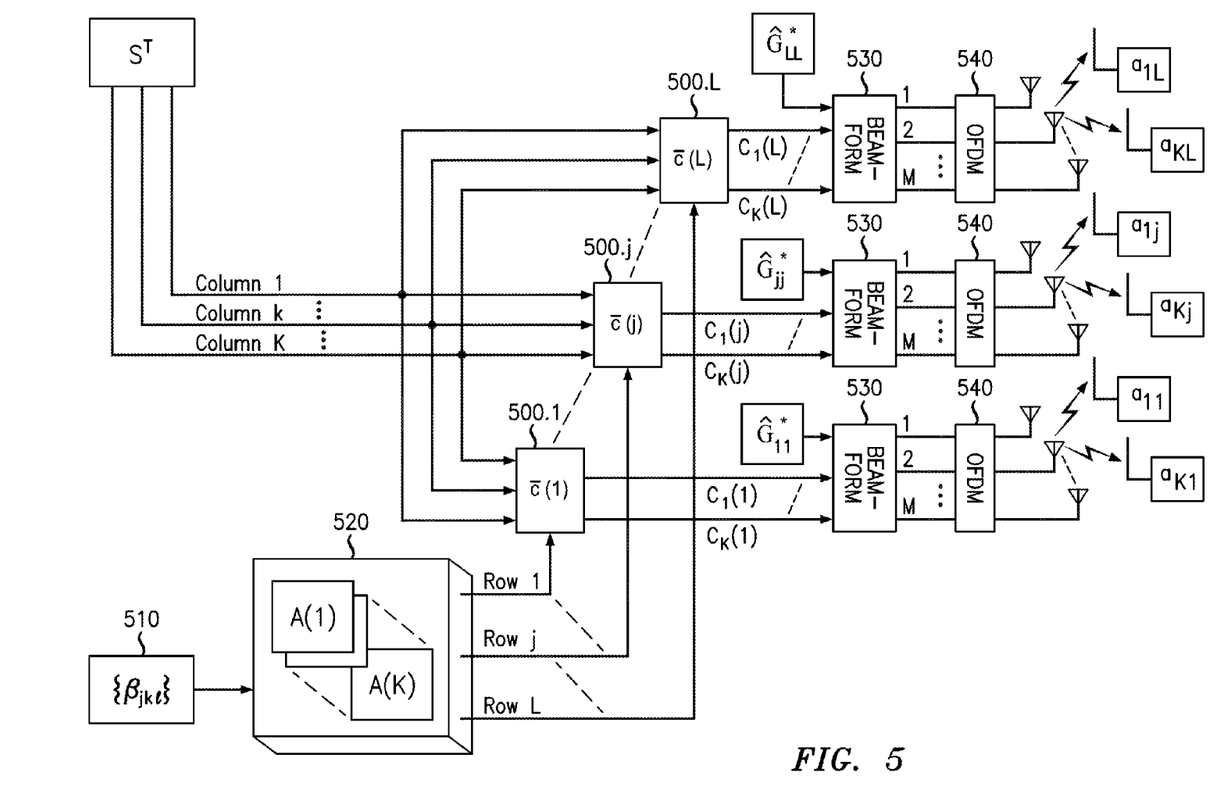
FIG. 5 is a signal flow diagram further illustrating the processing of forward-link signals.

FIG. 5 provides another view of the processing of the forward-link signals. As seen in the figure, the K columns of the signal matrix $S^T$ are provided as input to computational blocks 500.1-500.L. The set 510 of slow-fading coefficients is provided as input to computational block 520, where the precoding matrices A(1), . . . , A(K) are computed. The j-th row of each of the precoding matrices is provided as input to the j-th one of computational blocks 500.1-500.L, j=1, . . . , L.

At the output side, the j-th one of computational blocks 500.1-500.L provides the K pilot contamination precoded symbols $c_1(j), \ldots, c_K(j)$, for all j. In each cell, the pilot contamination precoded symbols are provided as input to a beamformer 530, together with the applicable beamforming precoding matrix $\hat{G}^*_{jj}$. The output of each beamformer is subjected to appropriate radiofrequency modulation, e.g. OFDM modulation 540, and transmitted.

Reverse Link

On the reverse link, the j-th base station receives, in one symbol interval and within each tone, an M×1 vector which constitutes, at each antenna of the base station, a sum of the transmissions from all of the terminals in all L of the cells. The received vector $\bar{x}(j)$ is given by the following expression, in which we continue to suppress an explicit representation of the dependence on the tone index n:

$$\bar{x}(j) = \sqrt{\rho_r}\sum_{l=1}^{L} G_{jl}\bar{a}(l) + \bar{w}(j), \qquad (13)$$

where $\rho_r$ is a measure of signal-to-noise ratio $\bar{a}(l)$ is the K×1 vector of symbols $$\begin{pmatrix} \bar{a}_{1l} \\ \bar{a}_{2l} \\ \vdots \\ \bar{a}_{Kl} \end{pmatrix}$$

from the terminals of the l-th cell, and $\bar{w}(j)$ is a vector of receiver noise whose components are assumed to be zero-mean, mutually uncorrelated, and uncorrelated with the channel matrices. $G_{jl}$ is the M×K channel matrix given above.

The base station processes its received signal using the well-known technique of maximum-ratio combining. Accordingly, the processed signal, represented by the K×1 vector $\bar{y}(j)$, is obtained by multiplying $\bar{x}(j)$ by the conjugate transpose of the channel estimate $\hat{G}^*_{jj}$:

$$\bar{y}(j) = \frac{1}{M}\hat{G}^{\dagger}_{jj}\bar{x}(j) \qquad (14)$$

-continued $$= \frac{1}{M}\left[\sqrt{\rho_p}\sum_{l_1=1}^{L}G_{jl_1}+V(j)\right]^{\dagger}\left[\sqrt{\rho_r}\sum_{l_2=1}^{L}G_{jl_2}\bar{a}(l_2)+\bar{w}(j)\right].$$

We recall here that the channel coefficient g is factored into a fast fading factor h and a slow fading factor $\beta^{1/2}$; i.e., $g_{nmjkl}=\beta_{jkl}^{1/2}$.

We observe that in the expansion of the product defined by the above equation, each additive term is proportional to an inner product between two M-component random vectors due to respective columns of the channel matrix $G_{jl}$. Insofar as our assumption of asymptotic orthogonality is accurate, the effects of fast fading and random noise will tend to average out as M increases without bound, and the summation will tend toward a limiting expression, such that the k-th component of $\bar{y}(j)$ is given (in the limit of large M) by $$\bar{y}_{kj} = \sqrt{\rho_p \rho_r}\sum_{l=1}^{L}\beta_{jkl}\bar{a}_{kl}. \quad (15)$$

More generally, let us define the K×L matrix Y by $[Y]_{kj}=\bar{y}_{kj}$. It will be seen that the vector $\bar{y}(j)$ is the j-th column of Y. We refer to Y as the received reverse-link signal matrix. The element in row k and column j of matrix Y is the cumulative message received from terminal group k by base station j. Thus, it will be understood that the j-th column of Y consists of the cumulative messages from the respective terminal groups received by base station j.

We now define the L×L matrix $\bar{B}(k)$ by:

$$\bar{B}(k) = B^T(k) = \begin{pmatrix} \beta_{1k1} & \beta_{1k2} & \cdots & \beta_{1kL} \\ \beta_{2k1} & \beta_{2k2} & \cdots & \beta_{2kL} \\ \vdots & \vdots & \vdots & \vdots \\ \beta_{Lk1} & \beta_{Lk2} & \cdots & \beta_{LkL} \end{pmatrix}. \quad (16)$$

Now let us define the vector $\bar{c}(k)$ as the k-th row of Y. Let us define the vector $\bar{b}(k)$ as the L×1 vector consisting of the signals transmitted by the respective terminals of group k; i.e., $$\bar{b}(k) = \begin{pmatrix} \bar{a}_{k1} \\ \bar{a}_{k2} \\ \vdots \\ \bar{a}_{kL} \end{pmatrix}. \quad (17)$$

It will be seen from the preceding expressions that under our approximation for large M, the k-th row of Y is given by $$\bar{c}(k)=\sqrt{\rho_p\rho_r}\cdot[\bar{B}(k)\bar{b}(k)]^T. \quad (18)$$

It will be understood that the k-th row of Y consists of the cumulative messages received from terminal group k by the respective base stations.

Each base station will seek to recover the reverse link symbol destined for it that is transmitted by each terminal in its service area. That is, the base station of cell j will seek to recover the respective symbols $\bar{a}_{kj}$, k=1, . . . , K, transmitted from the K terminals served by the cell.

To achieve this according to our new approach, the base stations exchange information so that the matrix Y is known to all of the base stations. Communication channels provided by the backhaul may be used for such purpose, for example.

For each terminal group k, the matrix $\bar{B}(k)$, or equivalently its transpose B(k), may be obtained by a central node as described above.

For all values of j, the base station of cell j distributes, to all other base stations, the values $\bar{y}_{kj}$, k=1, . . . , K. Stated differently, the base station of cell j distributes $\bar{y}(j)$ to the base stations of all the other cells so that each cell can construct for itself the full received reverse-link signal matrix Y.

We now define a pilot contamination postcoding matrix $\bar{A}(k)=f[\bar{B}(k)]$, where f[•] denotes matrix inversion or another function for obtaining a postcoding matrix that minimizes interference and maximizes the power of useful signals. The postcoding matrices may, for example, be computed by a server at the central node and distributed from there to the base stations.

For each value of k, each base station computes $\bar{A}(k)[\bar{c}(k)]^T=\bar{A}(k)\cdot\sqrt{\rho_p\rho_r}\cdot\bar{B}(k)\bar{b}(k)\cong\bar{b}(k)$ to recover the values $\bar{a}_{k1}, \bar{a}_{k2}, \ldots, \bar{a}_{kL}$. Thus, in particular, the base station of cell j will recover the values $\bar{a}_{1j}, \bar{a}_{2j}, \ldots, \bar{a}_{Kj}$.

Figure 6:
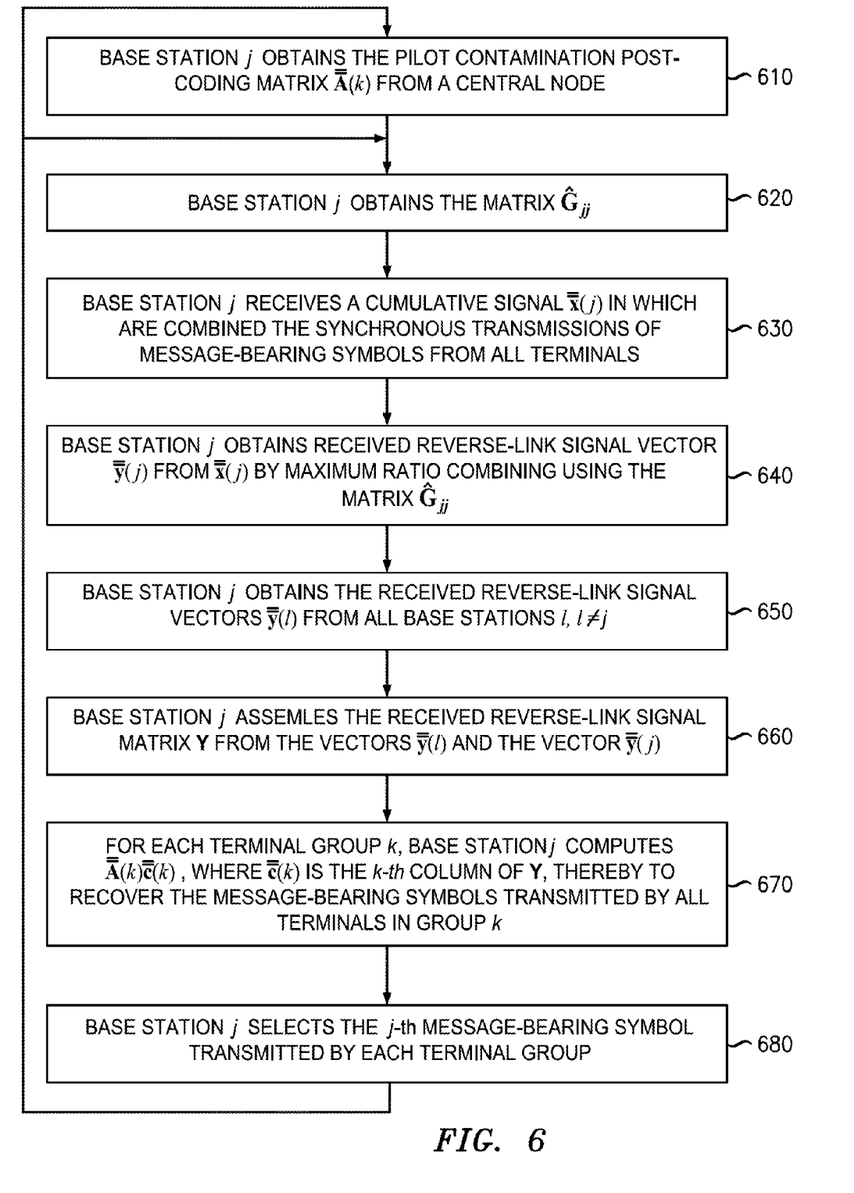
FIG. 6 is a flowchart illustrating the processing of reverse-link signals by a base station, according to an embodiment of the invention.

The various operations described above, as performed by a base station, are summarized in FIG. 6, to which we now turn. The steps illustrated in FIG. 6 are directed to one representative base station, namely base station j, but it will be understood that the same steps are to be performed by each of the L base stations in the network. The steps as illustrated in the figure are meant to be exemplary and not limiting.

At 610, base station j obtains the pilot contamination postcoding matrix $\bar{A}(k)$ from the central node. At 620, the base station obtains the matrix $\hat{G}_{jj}$, whose elements are the estimates of the propagation coefficients between the antennas of base station j and the terminals that it serves. It will be seen in the figure that $\bar{A}(k)$ and $\hat{G}_{jj}$ may be updated on different cycles. That is because $\bar{A}(k)$ is based solely on slow-fading coefficients which, as noted above, need to be updated no more often than once per multiple symbol intervals. The estimation of $\hat{G}_{jj}$ by the base stations has been discussed above.

At 630, each antenna of the base station receives synchronous reverse-link transmissions from all (at most) KL terminals in the network. Accordingly, the signal $\bar{x}(j)$ is a vector having M elements, each of which is a cumulative signal that combines the transmitted message-bearing symbols from all of the transmitting terminals.

At 640, base station j processes the raw signal $\bar{x}(j)$ with maximum ratio combining, using $\hat{G}_{jj}$, to obtain the received reverse-link signal vector $\bar{y}(j)$. It will be understood that $\bar{y}(j)$ is a column vector having K elements, each of which is a cumulative signal that combines all transmitted message-bearing symbols from one of the K terminal groups.

At 650, the base station obtains the counterpart reverse-link signal vectors $\bar{y}(l)$ from all other base stations, i.e., from base station l, l=1, 2, . . . , L. At 660, the base station assembles the received reverse-link signal matrix Y from all of the reverse-link signal vectors, i.e., from the abovesaid vector $\bar{y}(j)$ and the abovesaid vectors $\bar{y}(l)$. It will be understood that each of said reverse-link signal vectors constitutes a column of Y, there being a correspondence between respective cells and respective columns of Y.

At 670, base station j selects each of the rows of Y in turn. The base station transposes each row $\bar{c}(k)$ and then left-multiplies it by the pilot contamination postcoding matrix $\bar{A}(k)$, it being understood that each row of Y corresponds to a respective terminal group. The result of each left multiplication is a vector having L elements, in which each of the elements is the recovered message-bearing symbol received on the reverse link by one of the (at most) L terminals in the k-th terminal group.

Thus, base station j recovers (at most) L symbols from each terminal group. At 680, the base station selects the j-th symbol recovered from each terminal group. That is, the base station selects, from each terminal group, that message-bearing symbol that was destined for itself.

Figure 7:
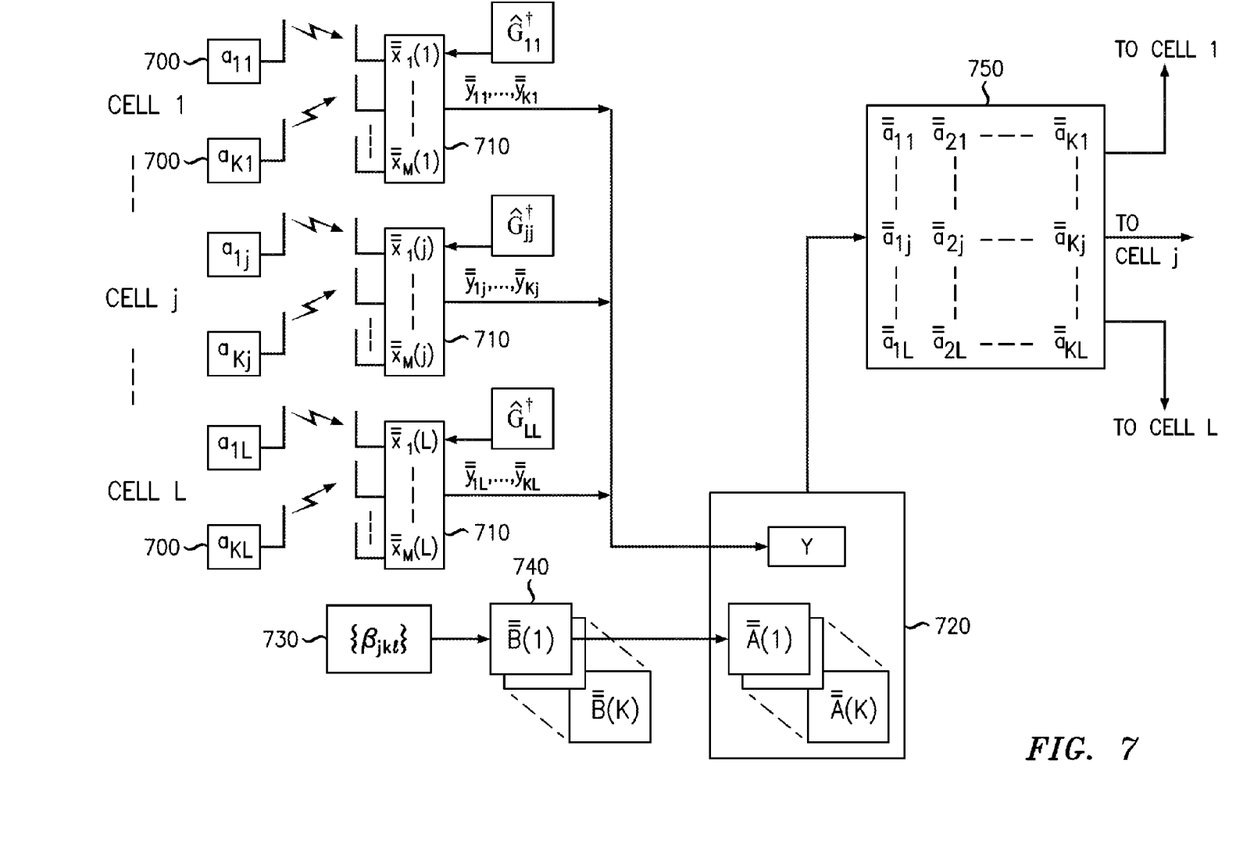
FIG. 7 is a signal flow diagram further illustrating the processing of reverse-link signals.

FIG. 7 provides another view of the processing of the reverse-link signals. As seen in the figure, terminals 700 transmit reverse-link signals, which are received as $$\bar{x}(j) = \begin{pmatrix} \bar{x}_1(j) \\ \vdots \\ \bar{x}_M(j) \end{pmatrix}$$

by base stations 710. For all j, j=1, . . . , L, the j-th base station applies for each frequency subchannel the conjugate transpose $\hat{G}\dagger_{jj}$ of the respective channel matrix estimate $\hat{G}_{jj}^t$ for its own cell, thereby to obtain the K received symbols $y_{1j}$, . . . , $y_{Kj}$.

The received symbols are forwarded by each base station to computational block 720, where they are conceptually shown as being assembled into received signal matrix Y. (As those skilled in the art will understand, references to the matrix Y are made solely as an aid to comprehension, whereas in practice there need not be any explicit computational step of constructing matrix Y.)

The set 730 of slow-fading coefficients is provided as input to computational block 740, where the matrices $\bar{B}(k)$ are computed for all k, k=1, . . . , K. The matrices $\bar{B}(k)$ are provided as input to computational block 720, where, for all k, the pilot contamination postcoding matrices $\bar{A}(k)$ are computed.

Also at block 720, the pilot contamination postcoding matrices $\bar{A}(k)$ operate on the received signal matrix Y to recover the message-bearing symbols $a_{kj}$, k=1, . . . , K, j=1, . . . , L, as indicated at block 750 of the figure. As noted above, each base station may individually perform the computation to recover the message-bearing symbols.

Alternatively, the computation may be performed at a central location, and the symbols destined for each respective base station may then be forwarded to that base station. Accordingly, the figure represents the recovered symbols at block 750 as a matrix in which each row corresponds to a respective cell, and each column corresponds to a respective terminal group. As indicated in the figure, each row of the matrix is forwarded to its corresponding base station.

Various of the mathematical computations described above, including the computation of the pilot contamination precoding matrix and the pilot contamination postcoding matrix, may be performed by digital processors situated at individual base stations, or by digital processors situated at a central unit, or by a combination of digital processors situated in various ways. Without limitation, the digital processor may be any of general or special purpose digital computers, microprocessors, digital signal processors, or the like, acting under controls embodied in software, firmware, or hardware.

It will be understood that various approximations and alternative algorithms and mathematical formulations not explicitly described above may be used in implementations, without departing from the principles described above. Not least of these would be the setting of certain quantities, such as measured values of propagation coefficients, to zero if their values lie below an appropriate threshold.

It should also be understood that we have used the term "cell" in a broad sense to mean a cell, a sector, or any similar defined reception area within a wireless network.

What is claimed is:

1. A method performed by a base station in a cellular network in which the base station serves a population of same-cell terminals, the cellular network includes other base stations that serve respective populations of other-cell terminals, the terminals are allocated to two or more terminal groups, each terminal group is a reuse group for pilot signals transmitted by terminals, and each terminal Within a given cell belongs to a respective terminal group; the method comprising:

obtaining a message destined for each of one or more same-cell terminals;

further obtaining a message destined for each of one or more other-cell terminals belonging to each of two or more terminal groups;

linearly combining the messages destined for the same-cell and other-cell terminals of each terminal group, thereby to form a pilot contamination precoded message for each terminal group, wherein the linear combining is performed using a set of slow-fading coefficients;

performing beam-forming precoding on the pilot contamination precoded messages using a set of fast-fading coefficients; and transmitting the pilot contamination precoded messages synchronously with the other base stations, wherein the transmitting is performed using multiple antennas, fast-fading coefficients apply only to same-cell terminals, slow-fading coefficients apply to same-cell and to other-cell terminals and the fast-fading coefficients are updated more frequently than the slow-fading coefficients.

2. The method of claim 1, further comprising:
updating the fast-fading coefficients on a first schedule; and
updating the slow-fading coefficients on a second schedule that iterates more slowly than the first schedule.

3. The method of claim 2, wherein the slow-fading coefficients used for the linearly combining step do not discriminate among the multiple antennas used for the transmitting step.

4. The method of claim 1, wherein the transmitting step is performed using OFDM modulation.

5. A method performed by a base station in a cellular network in which the base station serves a population of same-cell terminals, the cellular network includes other base stations that serve respective populations of other-cell terminals, the terminals are allocated to two or more terminal groups, each terminal group is a reuse group for pilot signals transmitted by terminals, and each terminal within a given cell belongs to a respective terminal group; the method comprising:

receiving a respective reverse-link signal from each of two or more terminal groups, wherein each said respective reverse-link signal is a combination of reverse-link signals synchronously transmitted by a plurality of same-cell and other-cell terminals in a same terminal group;

obtaining from each of one or more other base stations a further reverse-link signal received by the other base stations from each of the terminal groups; and the WLAN communication module is configured to receive the wideband data from the embedded operating system software module and to enable users in the WLAN to share the wideband data; and linearly combining selected received signals and obtained signals, thereby to recover reverse-link messages transmitted by same-cell terminals in the each of two or more terminal groups, wherein the linear combining is performed using a set of slow-fading coefficients and slow-fading coefficients apply to same-cell terminals and to other-cell terminals;

wherein:

the receiving step is performed using maximum-ratio combining;

the receiving step is performed using multiple base station antennas;

the maximum-ratio combining is performed using fast-fading coefficients;

fast-fading coefficients apply only to same-cell terminals; and the fast-fading coefficients are updated more frequently than the slow-fading coefficients.

6. The method of claim 5, wherein the receiving step is performed using OFDM demodulation.

7. The method of claim 5, wherein the slow-fading coefficients used for the linearly combining step do not discriminate among the multiple base station antennas used for the receiving step.

8. Base station apparatus adapted to serve a population of same-cell terminals within a cellular network that also includes other base stations that serve respective populations of other-cell terminals, comprising:

means for obtaining messages destined for a plurality of same-cell terminals and for a plurality of other-cell terminals;

means for forming a plurality of pilot contamination precoded messages from said messages, wherein each said precoded message pertains to a respective terminal group, each terminal group is a reuse group for pilot signals transmitted by terminals, each terminal within a given cell belongs to a respective terminal group, and each pilot contamination precoded message is a linear combination of the messages destined for the same-cell and the other-cell terminals of a respective terminal group;

means for transmitting the pilot contamination precoded messages synchronously with the other base stations; and means for measuring and updating a set of slow-fading coefficients and a set of fast-fading coefficients;

wherein:

the means for forming precoded messages is configured to form the linear combinations using slow-fading coefficients;

the beam-forming precoder is configured to further precode the pilot contamination precoded messages using fast-fading coefficients;

the transmitting is performed using multiple antennas;

the slow-fading coefficients apply to same-cell terminals and to other-cell terminals;

the fast-fading coefficients apply only to the same-cell terminals; and the fast-fading coefficients are updated more frequently than the slow-fading coefficients.

9. The base station apparatus of claim 8, wherein the means for transmitting comprises an OFDM transmitter.

10. The base station apparatus of claim 8, wherein the beam-forming precoder is configurable to operate on the pilot contamination precoded messages before transmitted.

11. Base station apparatus adapted to serve a population of same-cell terminals within a cellular network that also includes other base stations that serve respective populations of other-cell terminals, comprising:

means for receiving a respective reverse-link signal from each of a plurality of terminal groups, wherein each terminal group is a reuse group for pilot signals transmitted by terminals, each terminal within a given cell belongs to a respective terminal group, and each said signal is a combination of reverse-link signals synchronously transmitted by a plurality of same-cell and other-cell terminals in a same terminal group;

means for obtaining from each of a plurality of other base stations a further reverse-link signal received by the other base station from each of the terminal groups; and means for linearly combining selected received signals and obtained signals, thereby to recover reverse-link messages transmitted by the same-cell terminals in each of two or more terminal groups.

wherein:

the base station comprise two or more antennas;

the means for linearly combining is configurable to form the linear combinations using a set of slow-fading coefficients;

the means for receiving comprises a maximum ratio combiner;

the maximum ratio combiner is configured to perform maximum ratio combining using a set of fast-fading coefficients;

the slow-fading coefficients apply to same-cell terminals and to other-cell terminals;

the fast-fading coefficients apply only to the same-cell terminals; and means for measuring and updating a set of slow-fading coefficients and a set of fast-fading coefficients, wherein the fast-fading coefficients are updated more frequently than the slow-fading coefficients.

12. The base station apparatus of claim 11, wherein the means for receiving further comprises an OFDM demodulator.

* * * * *